(12) United States Patent
Lin et al.

(10) Patent No.: US 11,720,559 B2
(45) Date of Patent: Aug. 8, 2023

(54) BRIDGING TEXTUAL AND TABULAR DATA FOR CROSS DOMAIN TEXT-TO-QUERY LANGUAGE SEMANTIC PARSING WITH A PRE-TRAINED TRANSFORMER LANGUAGE ENCODER AND ANCHOR TEXT

(71) Applicant: salesforce.com, inc., San Francisco, CA (US)

(72) Inventors: Xi Lin, Palo Alto, CA (US); Caiming Xiong, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 95 days.

(21) Appl. No.: 17/064,466

(22) Filed: Oct. 6, 2020

(65) Prior Publication Data

US 2021/0374133 A1 Dec. 2, 2021

Related U.S. Application Data

(60) Provisional application No. 63/033,770, filed on Jun. 2, 2020.

(51) Int. Cl.
*G06F 16/30* (2019.01)
*G06F 16/2452* (2019.01)
(Continued)

(52) U.S. Cl.
CPC ...... *G06F 16/24522* (2019.01); *G06F 16/212* (2019.01); *G06F 16/2282* (2019.01);
(Continued)

(58) Field of Classification Search
CPC ............ G06F 16/24522; G06F 16/243; G06F 16/2282; G06F 16/212
See application file for complete search history.

(56) References Cited

U.S. PATENT DOCUMENTS 10,282,663 B2  5/2019  Socher et al.
10,346,721 B2  7/2019  Albright et al.
(Continued)

OTHER PUBLICATIONS

Bogin et al., "Global Reasoning over Database Structures for Text-to-SQL Parsing," In Proceedings of the 2019 Conference on Empirical Methods in Natural Language Processing and the 9th International Joint Conference on Natural Language Processing, Nov. 3-7, 2019, pp. 3659-3664.

(Continued)

*Primary Examiner* — Khanh B Pham
(74) *Attorney, Agent, or Firm* — Haynes and Boone, LLP

(57) ABSTRACT

A text-to-database neural network architecture is provided. The architecture receives a natural language question and a database schema and generates a serialized question-schema representation that includes a question and at least one table and at least one field from the database schema. The serialized question-schema representation is appended with at least one value that matches a word in the natural language question and at least one field in a database picklist. An encoder in the architecture generates question and schema encodings from the appended question-schema representation. Schema encodings are associated with metadata that indicates a data type of the fields and whether fields are associated with primary or foreign keys. A decoder in the architecture generates an executable query from the question encodings and schema encodings.

20 Claims, 5 Drawing Sheets

(51) Int. Cl.
*G06F 16/21* (2019.01)
*G06F 16/22* (2019.01)
*G06N 3/088* (2023.01)
*G06F 16/242* (2019.01)
*G06N 3/044* (2023.01)
*G06N 3/045* (2023.01)

(52) U.S. Cl.
CPC .......... *G06F 16/243* (2019.01); *G06N 3/044* (2023.01); *G06N 3/045* (2023.01); *G06N 3/088* (2013.01)

(56) References Cited

U.S. PATENT DOCUMENTS

| | | | |
|---|---|---|---|
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 10,817,650 B2 | 10/2020 | McCann et al. | |
| 10,839,284 B2 | 11/2020 | Hashimoto et al. | |
| 10,846,478 B2 | 11/2020 | Lu et al. | |
| 10,902,289 B2 | 1/2021 | Gao et al. | |
| 10,909,157 B2 | 2/2021 | Paulus et al. | |
| 10,929,607 B2 | 2/2021 | Zhong et al. | |
| 10,958,925 B2 | 3/2021 | Zhou et al. | |
| 10,963,652 B2 | 3/2021 | Hashimoto et al. | |
| 10,963,782 B2 | 3/2021 | Xiong et al. | |
| 10,970,486 B2 | 4/2021 | Machado et al. | |
| 11,151,131 B2* | 10/2021 | Shaik ................. | G06F 16/2282 |
| 2012/0019309 A1* | 1/2012 | Turner ................. | H03K 5/1254 |
| | | | 327/524 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0268287 A1 | 9/2018 | Johansen et al. | |
| 2018/0268298 A1 | 9/2018 | Johansen et al. | |
| 2018/0336198 A1* | 11/2018 | Zhong ............... | G06F 16/24522 |
| 2018/0336453 A1 | 11/2018 | Merity et al. | |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0302178 A1 | 9/2020 | Gao et al. | |
| 2020/0334233 A1* | 10/2020 | Lee ......................... | G06N 3/08 |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0364580 A1 | 11/2020 | Shang et al. | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | McCann et al. | |
| 2021/0019309 A1* | 1/2021 | Yadav .................. | G06F 16/248 |
| 2021/0042604 A1 | 2/2021 | Hashimoto et al. | |
| 2021/0049236 A1 | 2/2021 | Nguyen et al. | |
| 2021/0073459 A1 | 3/2021 | McCann et al. | |
| 2021/0089588 A1 | 3/2021 | Le et al. | |
| 2021/0089882 A1 | 3/2021 | Sun et al. | |
| 2021/0089883 A1 | 3/2021 | Li et al. | |
| 2021/0192397 A1* | 6/2021 | Rastogi ................. | G06F 16/243 |

OTHER PUBLICATIONS

Bogin et al., "Representing Schema Structure with Graph Neural Networks for Text-to-SQL Parsing," In Proceedings of the 57th Conference of the Association for Computational Linguistics, ACL 2019, Jul. 28-Aug. 2, 2019, vol. 1: Long Papers, Association for Computational Linguistics, 2019, pp. 4560-4565.

Choi et al., "RYANSQL: Recursively Applying Sketch-based Slot Fillings for Complex Text-to-SQL in Cross-Domain Databases," CoRR, arXiv:2004.03125v1 [cs.CL], Apr. 7, 2020, 10 pages.

Dahl et al., "Expanding the Scope of the ATIS Task: The ATIS-3 Corpus," In Human Language Technology, Proceedings of a Workshop held at Plainsboro, New Jerey, USA, Mar. 8-11, 1994, pp. 43-48.

Devlin et al., "BERT: Pre-training of Deep Bidirectional Transformers for Language Understanding," In Proceedings of the 2019 Conference of the North American Chapter of the Association for Computational Linguistics: Human Language Technologies, vol. 1, Jun. 2-7, 2019, pp. 4171-4186.

Dong et al., "Language to Logical Form with Neural Attention," In Proceedings of the 54th Annual Meeting of the Association for Computational Linguistics, Association for Computational Linguistics 2016, Aug. 7-12, 2016, vol. 1, 2016, pp. 33-43.

Gu et al., "Incorporating Copying Mechanism in Sequence-to-Sequence Learning," In Proceedings of the 54th Annual Meeting of the Association for Computational Linguistics, Association for Computational Linguistics 2016, vol. 1, Aug. 7-12, 2016, pp. 1631-1640.

Guo et al., "Towards Complex Text-to-SQL in Cross-Domain Database with Intermediate Representation," In Proceedings of the 57th Conference of the Association for Computational Linguistics, ACL 2019, vol. 1, Jul. 28-Aug. 2, 2019, pp. 4524-4535.

He et al., "X-SQL: reinforce schema representation with context," CoRR, abs/1908.08113, May 29, 2019, 5 pages.

Hemphill et al., "The ATIS Spoken Language Systems Pilot Corpus," In Speech and Natural Language: Proceedings of a Workshop Held at Hidden Valley, Pennsylvania, USA, Jun. 24-27, 1990, pp. 96-101.

Herzig et al., "TAPAS: Weakly Supervised Table Parsing via Pre-training," In Proceedings of the 58th Annual Meeting of the Association for Computational Linguistics, vol. 1: Long Papers, Seattle, Washington, United States to appear, Jul. 5-10, 2020, pp. 4320-4333.

(56) References Cited

OTHER PUBLICATIONS

Hochreiter et al., "Long Short-Term Memory," Neural Computation, vol. 9, No. 8, 1997, pp. 1-32.
Hwang et al., "A Comprehensive Exploration on WikiSQL with Table-Aware Word Contextualization," 33rd Conference on Neural Information Processing Systems (NeurIPS 2019), 2019, pp. 1-34.
Jawahar et al., "What does BERT learn about the structure of language?," In Proceedings of the 57th Conference of the Association for Computational Linguistics, ACL 2019, Florence, Italy, vol. 1, Jul. 28-Aug. 2, 2019, pp. 3651-3657.
Kelkar et al., "Bertrand-DR: Improving Text-to-SQL using a Discriminative Re-ranker," arXiv preprint arXiv:2002.00557, Nov. 3, 2020, 7 pages.
Kingma et al., "Adam: A Method For Stochastic Optimization," In 3rd International Conference on Learning Representations, ICLR 2015, May 7-9, 2015, Conference Track Proceedings, 2015, pp. 1-15.
Liang et al., "Memory Augmented Policy Optimization for Program Synthesis and Semantic Parsing," In Advances in Neural Information Processing Systems 31: Annual Conference on Neural Information Processing Systems 2018, Dec. 3-8, 2018, 17 pages.
Liu et al., "RoBERTa: A Robustly Optimized BERT Pretraining Approach," CoRR, abs/1907.11692, Jul. 26, 2019, 13 pages.
Zettlemoyer et al., "Learning to Map Sentences to Logical Form: Structured Classification with Probabilistic Categorial Grammars," In UAI '05, Proceedings of the 21st Conference in Uncertainty in Artificial Intelligence, Edinburgh, Scotland, Jul. 26-29, 2005, pp. 658-666.
Lyu et al., "Hybrid Ranking Network for Text-to-SQL," Technical Report MSR-TR-2020-7, Microsoft Dynamics 365 AI, 2020, 12 pages.
Rastogi et al., "Towards Scalable Multi-Domain Conversational Agents: The Schema-Guided Dialogue Dataset," CoRR, abs/1909.05855, Association for the Advancement of Artificial Intelligence, Jan. 29, 2020, 11 pages.
See et al., "Get To The Point: Summarization With Pointer-Generator Networks," In Proceedings of the 55th Annual Meeting of the Association for Computational Linguistics, ACL 2017, vol. 1, Apr. 25, 2017, 20 pages.
Shaw et al., "Self-Attention with Relative Position Representations," In Proceedings of the 2018 Conference of the North American Chapter of the Association for Computational Linguistics: Human Language Technologies, vol. 2, Jun. 1-6, 2018, pp. 464-468.
Suhr et al., "Exploring Unexplored Generalization Challenges for Cross-Database Semantic Parsing," In The 58th annual meeting of the Association for Computational Linguistics (ACL), Jul. 5-10, 2020, pp. 8372-8388.
Tenney et al., "What Do You Learn From Context? Probing for Sentence Structure in Contextualized Word Representations," In 7th International Conference on Learning Representations, ICLR 2019, May 6-9, 2019, pp. 1-17.
Vaswani et al., "Attention Is All You Need," In Advances in Neural Information Processing Systems 30: Annual Conference on Neural Information Processing Systems, 2017, Dec. 4-9, 2017, pp. 5998-6008.
Wang et al., "Execution-Guided Neural Program Decoding," CoRR, abs/1807.03100, Jul. 9, 2018, 8 pages.
Wang et al., "RAT-SQL: Relation-Aware Schema Encoding and Linking for Text-to-SQL Parsers," ArXiv, abs/1911.04942, Nov. 10, 2019, 12 pages.
Wolf et al., "Huggingface's Transformers: State-of-the-Art Natural Language Processing," ArXiv, abs/1910.03771, Oct. 16, 2019, 8 pages.
Yin et al., "Tabert: Pretraining for joint understanding of textual and tabular data," CoRR, abs/2005.08314, May 17, 2020, 15 pages.
Yu et al., "SyntaxSQLNet: Syntax Tree Networks for Complex and Cross-Domain Text-to-SQL Task," In Proceedings of the 2018 Conference on Empirical Methods in Natural Language Processing, Brussels, Belgium, Oct. 31-Nov. 4, 2018, pp. 1653-1663.
Zelle et al., "Learning to parse database queries using inductive logic programming," In Proceedings of the Thirteenth National Conference on Artificial Intelligence and Eighth Innovative Applications of Art{ficial Intelligence Conference, AAAI 96, IAAI 96, vol. 2, Aug. 4-8, 1996, pp. 1050-1055.
Zhang et al., "Editing-Based SQL Query Generation for Cross-Domain Context-Dependent Questions," CoRR, abs/1909.00786, Sep. 10, 2019, 9 pages.
Zhong et al., "SEQ2SQL: Generating Structured Queries From Natural Language Using Reinforcement Learning," CoRR, abs/1709.00103, Nov. 9, 2017, pp. 1-12.

* cited by examiner

BRIDGING TEXTUAL AND TABULAR DATA FOR CROSS DOMAIN TEXT-TO-QUERY LANGUAGE SEMANTIC PARSING WITH A PRE-TRAINED TRANSFORMER LANGUAGE ENCODER AND ANCHOR TEXT

CROSS-REFERENCE TO RELATED APPLICATION

This application claims priority to U.S. Provisional Application No. 63/033,770, filed on Jun. 2, 2020 which is incorporated by reference in its entirety.

TECHNICAL FIELD

The embodiments relate generally to text-to-database query processing, and more specifically to translating a natural language question into a database query.

BACKGROUND

Text-to-SQL semantic parsing addresses mapping natural language utterances to executable relational database queries. Conventional systems focus on training and testing the semantic parser for a single database. However, because there are numerous databases with different domains, developing a semantic parser for each individual database is a resource intensive and unscalable process.

The conventional semantic parsers may be trained on large-scale data sets from numerous databases and corresponding question-query pairs. However, because databases have different underlying schemas, a question that has a similar intent may correspond to drastically different queries in different databases. As a result, the cross-database text-to query semantic parsers cannot rely on memorizing known query patterns. Accordingly, what is needed are parsers that can model the natural language query, the target database structure, and the context of both query and database structure.

In the figures, elements having the same designations have the same or similar functions.

DETAILED DESCRIPTION

The embodiments are directed to a sequential text-database encoding framework. In the sequential text-database encoding framework the question and schema representation should be contextualized with each other. Also, in the sequential text-database encoding framework the large-scale pre-trained language models (LMs) such as bi-directional encoder representations from transformers (BERT) may boost parsing accuracy by providing better representations of text and capturing long-term dependencies. Further, the available database content, such as picklists associated with a field in a table, may resolve ambiguities in the database schema.

In some embodiments, the sequential text-database encoding framework represents the relational database schema as a tagged sequence concatenated to the question. Specifically, the sequential text-database encoding framework may encode the tagged hybrid sequence with a BERT and one or more lightweight subsequent layers, such as two single-layer bi-directional LSTMs. In the sequential text-database encoding framework, each schema component (table or field) is simply represented using the hidden state of its special token in the hybrid sequence. To align the schema components with a natural language question, the sequential text-database encoding framework augments the hybrid sequence with anchor texts. The anchor texts may be automatically extracted from database cell values mentioned in the question. Anchor texts may be appended to their corresponding fields in the hybrid sequence. The text-database alignment is then implicitly achieved via fine-tuned BERT attention between overlapped lexical tokens.

In some embodiments, the sequential text-database encoding framework further includes pointer-generator decoder and schema-consistency driven search space pruning.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
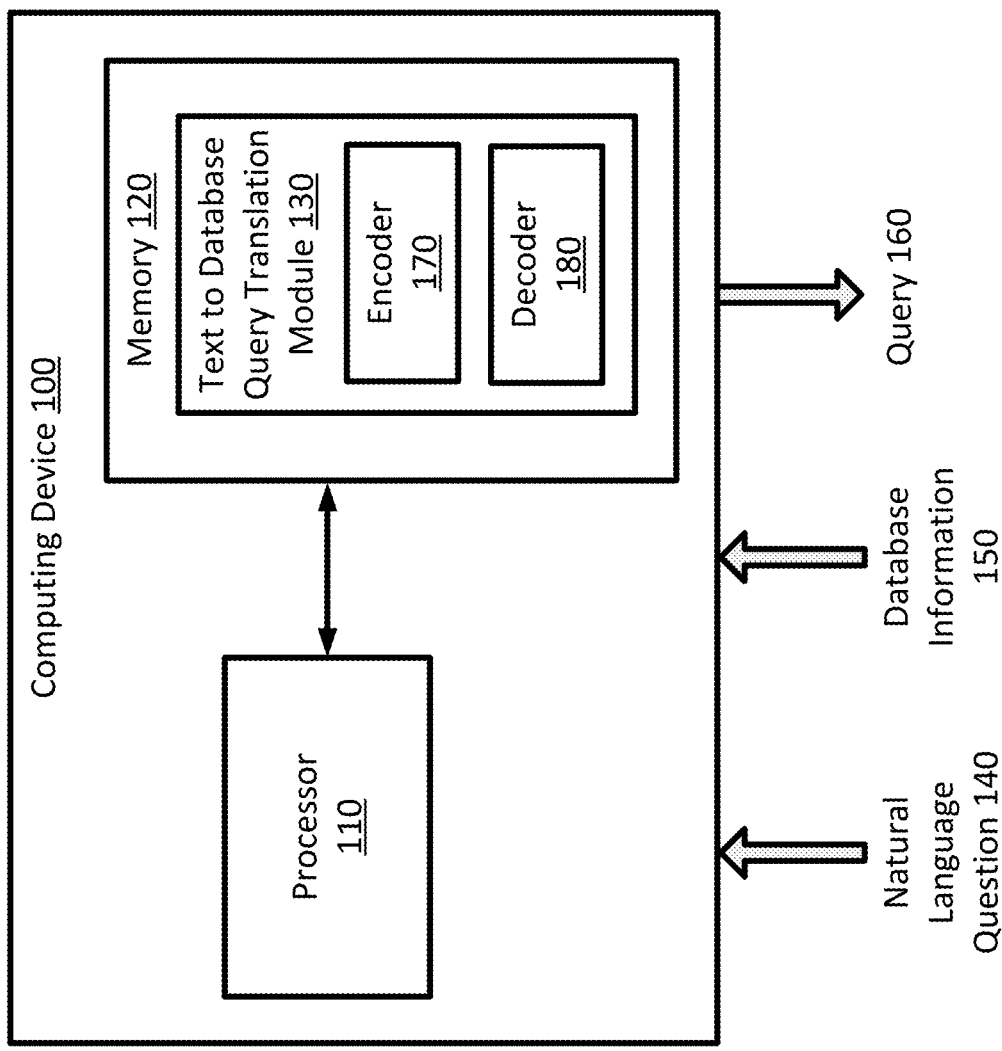
FIG. 1 is a simplified diagram of a computing device for implementing a text to database query translation module, according to some embodiments.

FIG. 1 is a simplified diagram of a computing device 100 for translating a natural language question into a database query, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on the same board, in the same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. For example, as shown, memory 120 includes instructions for a text-to-database query translation module 130 that may be used to implement and/or emulate the systems and models, and/or to implement any of the methods described further herein. In some examples, the text-to-database query translation module 130 may include a sequential text-database encoding framework that is combined with a sequential pointer generator to perform end-to-end cross-database text-to-query semantic parsing. The text-to-database query translation module 130 may translate natural language questions that are a string of text into database queries, such as structured query language (SQL) queries. The text-to-database query translation module 130 may receive input that includes a natural language question Q 140 (or simply question 140 or question Q) and database information 150. Natural language question Q 140 may be a natural question that computing device 100 received from a user or from another computing device. In a non-limiting embodiment, the natural language question Q 140 may be a string that includes text, e.g. alpha numeric text that is divided into words or tokens. Database information 150 may be a structure in a database such as a database schema or a portion of a database schema that includes names of tables and fields in some embodiments. Database information 150 that is a database schema may include tables and fields, such that S= ⟨T, C⟩ for a relational database. Thus, given question Q 140 and schema S the goal of text-to-database query translation module 130 is to generate a corresponding query Y 160 that consists of a sequence of tokens $\{y_1, \ldots, y_{|Y|}\}$. The query Y 160 may be an executable query, such a SQL query that is executable using a SQL database.

In some embodiments, a schema in a database consists of tables $T=\{t_1, \ldots, t_N\}$ and fields $C=\{c_{11}, \ldots, c_{1|T_1|}, \ldots, c_{N|T_N|}\}$. Each table may be associated with several fields. Further each table $t_i$ and the field $c_{ij}$ may have a textual name or be natural language phrases. The i and j in $t_i$ and the field $c_{ij}$ may be integers, such as integers that begin with zero or one. In some embodiments, field $c_{ij}$ may be a primary key used for uniquely indexing the corresponding data record. Field $c_{ij}$ may also be a foreign key used to reference a primary key in a different table $t_1$. In addition, each field has a data type $\tau \in$ [number, text, time, boolean, etc.].

Unlike conventional systems, the text-to-database query translation module 130 may use database content when converting question Q 140 into query Y 160. Specifically, text-to-database query translation module 130 may use a value set of each field $c_{11}$. For example, the field "Property Type Code" shown in FIG. 2, discussed below, can have the following values {"Apartment", "Field", "House", "Shop", "Other"} and may be referred to as anchor text values or "picklists." In some embodiments, the "picklists" may include non-sensitive fields and may not include individual data records, such as, user IDs, credit card numbers, etc.

As shown in FIG. 1, computing device 100 receives input such as a natural language question Q 140 and database information 150, which is provided to the text-to-database query translation module 130. The text-to-database query translation module 130 operates on the natural language question Q 140 and database information 150 to generate an output that is an executable database query Y 160.

In some embodiments, text-to-database query translation module 130 includes a value-aware question schema encoder 170 (or simply encoder 170) and decoder 180. Encoder 170 may capture dependencies between question Q 140 and database information 150 (e.g. schema S) so as to infer the correct database (e.g. SQL) logic.

Figure 2:
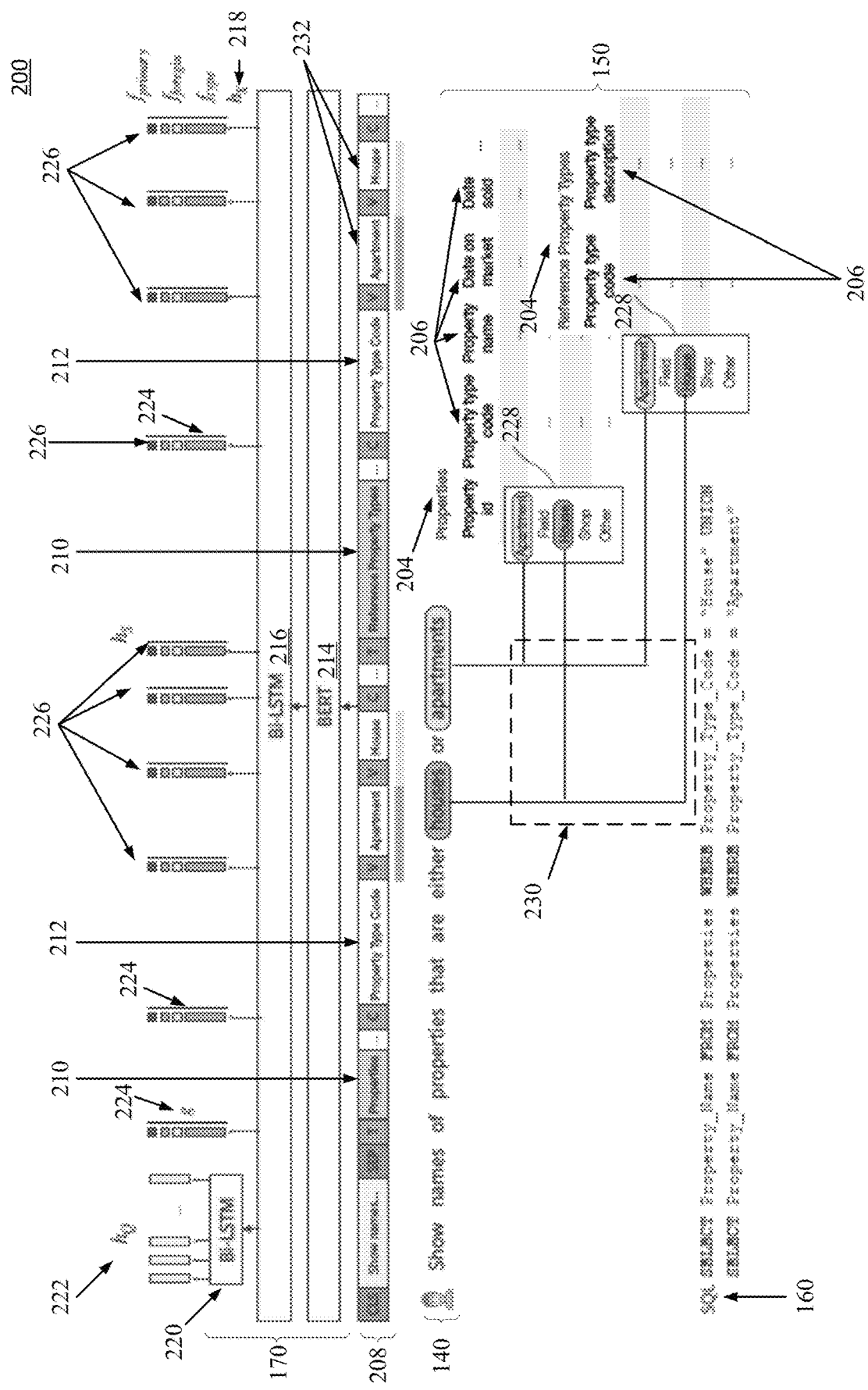
FIG. 2 is a block diagram of a value-aware question schema encoder, according to some embodiments.

FIG. 2 is a block diagram 200 of a value-aware question schema encoder, according to some embodiments. Encoder 170 may receive question Q 140 and database information 150 which may be a database schema. The database schema includes table 202 with table name 210 called "Properties" and fields 206 called "Property id", "Property type code", "Property Name", "Date on market", and "date sold". As shown in FIG. 2, encoder 170 receives question Q 140 and database information 150 as a serialized question-schema representation X 208 that includes different tokens. In serialized question-schema representation X 208 each table 202 is represented with table name 210 that corresponds to table name of table 202 followed by field names 212 that correspond to representation of fields 206 in table 202. Each table name 210 is preceded by the special table token [T] and each field name is preceded by the special field token [C]. The representations of multiple tables 202 may be concatenated to form the serialization of the schema S, which is surrounded by two special separator tokens [SEP] at the boundaries and concatenated to the question Q 140. Serialized question-schema representation X 208 may include question Q 140 as a single token. Question Q 140 may be preceded by the [CLS] token to form the serialized question-schema representation X 208, shown below:

$$X=[CLS],Q,[SEP],[T],t_{1,[}C],c_{11} \ldots ,c_{1|T_2|},[T],t_{2,[}C],c_{21} \ldots [SEP]$$

This format may be an input to Bi-directional Encoder Representations and Transformers (BERT) encoder 214, discussed below.

In some embodiments, encoder 170 includes a BERT encoder 214 and one or more bi-directional long-short term memories (bi-LSTMs) 216. BERT encoder 214 may be a pre-trained encoder. BERT encoder 214 may receive the serialized question-schema representation X 208 and encode the serialized question-schema representation X 208 into BERT encodings. The bi-directional LSTM 216 may receive the BERT encodings and generate the base question schema joint encoding $h_X \in R^{|X| \times n}$ labeled as 218. The question segment representations of $h_X$, that is the segment associated with question Q 140, may be passed through another bi-LSTM 220 to obtain the question encoding $h_Q \in R^{|Q| \times n}$ labeled as 222. The tables and fields may be represented as slices of encoding $h_X$ corresponding to the special tokens [T] and [C].

In some embodiments, encoder 170 may include a projection layer g 224. Projection layer g 224 may be trained to recognize different metadata features of database information 150, such as a database schema from the schema segment representations of $h_X$. For example, the dense look-up features of projection layer g 224 may be trained to determine if field 206 in table 202 is a primary key ($f_{pri} \in R^{2 \times n}$), if a field appears in a foreign key pair ($f_{for} \in R^{2 \times n}$), and the data type of the field ($f_{type} \in R^{|\tau| \times n}$).

Projection layer g 224 may be a neural network that fuses the metadata features with the schema segment representations in $h_X$ to obtain the final schema encodings $h_S$, labeled as 226. The fusion may also include a rectifier linear unit (ReLU) (not shown). The fusion of the metadata features by projection layer g 224 into the final schema encodings $h_S$ is shown below:

$$h^{t_i} = g([h_X^p; 0; 0; 0]), \quad \text{Equation 1}$$

$$h^{c_{ij}=g([x^q; f_{pri}^u; f_{for}^v; f_{type}^w])} = \text{ReLU}(W_g[h_X^m; f_{pri}^u; f_{for}^v; f_{type}^w] + b_g) \quad \text{Equation 2}$$

$$h_S = \left[ h^{t_1}, \ldots, h^{t|T|}, h^{C_{11}}, \ldots h^{C_N|T_N|} \right] \in R^{|S| \times n} \quad \text{Equation 3}$$

where p is the index of special token [T] associated with table $t_i$ in serialized question-schema representation X 208 and q is the index of special token [C] associated with field $c_{ij}$ in serialized question-schema representation X 208. Further, suppose u, v, and w are the feature indices indicating the corresponding properties of $c_{ij}$ in serialized question-schema representation X 208. The $[h_X^m; f_{pri}^u; f_{for}^v; f_{type}^w]$ the concatenation of the four vectors that include encodings $h_X$ vector, primary key vector, foreign key vector and the data type of the fields vector. Further, the metadata features are specific to fields 206 and the table representations are fused with zero placeholder vectors.

In some embodiments, using table names 210 and field names 212 from a database schema in serialized question-schema representation X 208 may not be sufficient to capture the semantics of the database schema and the dependencies between the database schema and question Q 140. For example, as illustrated in FIG. 2, field name "Property Type Code" is a general expression that is not explicitly mentioned in the question Q 140 that is "Show names of properties that are either houses or apartments." As further illustrated in FIG. 2, field "Property Type Code" includes a picklist 228 {"Apartment," "Field", "House", "Shop", "Other"}. Accordingly, without accessing the field picklist, it is difficult to determine which field(s) 206 in a table(s) 202 may be associated with the mentioned "houses" and "apartments" in question Q 140. It may also be difficult to associate the "houses" or "apartments" recited in question Q 140 with the field "Property Type Code."

In some embodiments, to resolve the ambiguity above, serialized question-schema representation X 208 may include anchor text that may link values included in question Q 140, such as "houses" and "apartments" to corresponding field(s) 206 in table(s) 202. To include anchor text in serialized question-schema representation X 208, encoder 170 may include a fuzzy string module 230. The fuzzy string module 230 may perform a fuzzy string match between the words in question Q 140 and each field picklist 228 of the database. For example, the fuzzy string module 230 may match the words "houses" and "apartments" to the picklist 228 for field "Property Type Code" that also includes terms "Apartment" and "House." The fuzzy string module 230 may then insert the matched field values, such as "Apartment" and "House" into the serialized question-schema representation X 208. Specifically, the matched fields, labeled as field values 232, may be inserted following the corresponding field name 212 separated by the special token [V]. If multiple values are matched for one field, the set of values in the matching order may be concatenated and separated by the special token [V] and appended to the field name 212 as shown in FIG. 2. Notably, the same natural language phrase may match with values in picklists 228 that correspond to multiple fields 206. In this case, all matches may be added to the serialized question-schema representation X 208 and BERT encoder 214 may learn to resolve ambiguity during training.

Figure 3:
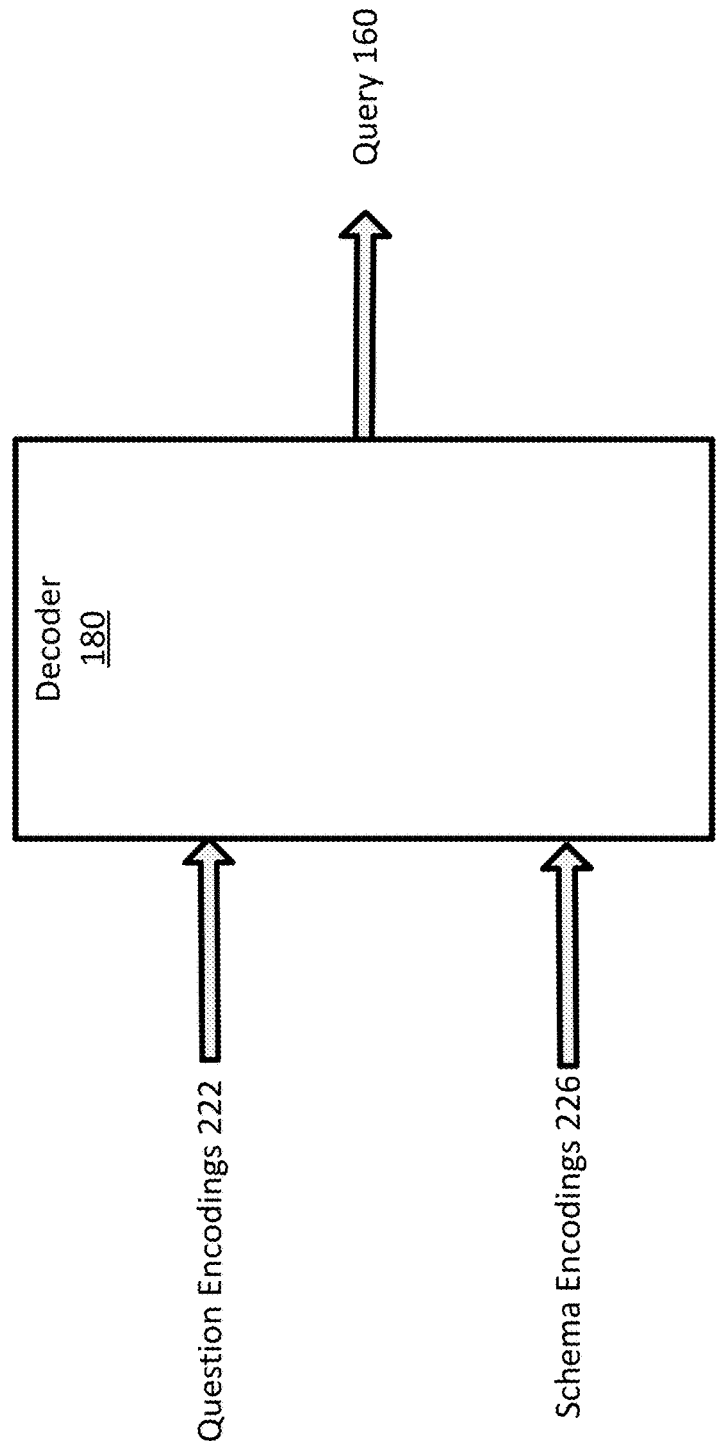
FIG. 3 is a block diagram of a decoder, according to some embodiments.

FIG. 3 is a block diagram 300 of a decoder, according to an embodiment. Decoder 180 may include an LSTM-based sequential pointer generator with a multi-head attention. Decoder 180 receives the final output of encoder 170. Decoder 180 may also have an internal state s. The final output of encoder 170 may be question encodings $h_Q$ and schema encodings $h_S$. At each step t, decoder 180 may perform one of the following actions: generate a token from the vocabulary V, copy a token from the question Q 140 or copy a schema component from database information 150, such as a schema S. The output of the decoder 180 at step t, may be a token or a word that is included in query Y 160.

In some embodiments, at each step t, given decoder state $s_t$ and encoder representation of question encodings and schema encodings $h_Q$; $h_S \in R^{(|Q|+|S|) \times n}$, decoder 180 may compute multi-head attention as shown below:

$$e_{tj}^{(h)} = \frac{s_t W_U^{(h)} (h_j W_V^{(h)})^T}{\sqrt{\frac{n}{H}}}; \alpha_{tj}^{(h)} = \text{softmax}\{e_{tj}^{(h)}\} \quad \text{Equation 4}$$

$$z_t^{(h)} = \sum_{j=1}^{|Q|+|S|} \alpha_{tj}^{(h)} (h_j W_V^{(h)}); z_t = [z_t^{(1)}; \ldots; z_t^{(H)}] \quad \text{Equation 5}$$

where $h \in [1, \ldots, H]$ is the head number and H is the total number of heads.

In some embodiments, the scalar probability of generating a word from the vocabulary V and the output distribution may be shown as:

$$p_{gen}^t = \text{sigmoid}(s_t W_{gen}^s + z_t W_{gen}^z + b_{gen}) \quad \text{Equation 6}$$

$$p_{out}^t = p_{gen}^t P_V(y_t) + (1 - p_{gen}^t) \sum_{j: \tilde{X}_j = y_t} \alpha_{tj}^{(H)} \quad \text{Equation 7}$$

where $P_V(y_t)$ is the standard LSTM softmax output distribution and X is the length of (|Q|+|S|) sequence that only consists of the question words and schema special tokens [T] and [C] from serialized question schema representation X 208. The $W_{gen}^s$ and $W_{gen}^z$ are weights of the trained decoder 180 and $b_{gen}$ is a configurable variance. In some embodiments, decoder 180 uses the attention weights of the last head to compute the pointing distribution. Based on the probability of generating a word from the vocabulary and the output distribution, decoder 180 selects either a token from the vocabulary V, a token from question Q 140, or a representation from schema S (such as a table name 210 or a field name 212) for inclusion as a word into query Y 160.

In some embodiments, the input state to model the generation history may be extended using a selective read operation. The selective read operation extends the input state of the LSTM in decoder 118 with the corresponding encoder hidden states of the tokens being copied. In this way, decoder 118 may be provided information for which part of the input has been copied.

In some embodiments, the input state of the LSTM in decoder 118 may be shown using a following equation:

$$y_{t=[e_{t-1};\zeta_{t-1}]} \in R^{2n}$$

where $e_{t-1} \in R^n$ is either the embedding of a generated vocabulary token or a learned vector indicating if a table, field or text token is copied in step t−1. In some embodiments, $\zeta_{t-1} \in R^n$ is the selective read vector which represents the information copied in step t−1 as shown below:

$$\zeta(y_{t-1}) = \sum_{j=1}^{|Q|+|S|} \rho_{t-1,j} h_j; \rho_{t-1,j} = \begin{cases} \frac{1}{K} \alpha_{t-1,j}^{(H)} & \tilde{X}_j = y_{t-1} \\ 0 & \text{otherwise} \end{cases} \quad \text{Equation 8}$$

where $$K = \sum_{j: \tilde{X}_j = y_{t-1}} \alpha_{t-1,j}^{(H)}$$

is a normalization term considering there may be multiple positions to $y_{t-1}$ in $\tilde{X}$.

In some embodiments, decoder 180 uses a generation vocabulary consisting of 70 keywords, such as SQL keywords and reserved tokens. Decoder 180 may also use 10 digits to generate numbers not explicitly mentioned in the question Q 140, (e.g. "first", "second", "youngest" etc.). Decoder 180 may use a bream size of 256 for leaderboard evaluation. Other experiments may use a beam size of 16. Decoder 180 may use schema-consistency guided decoding during the inference stage. Decoder 180 may also execute a static SQL correctness check on the beam search output to eliminate predictions that are either syntactically incorrect or violate schema consistency.

In some embodiments, the search space for decoder 180 may be exponential to the question length plus the size of the database schema. To reduce the search space, decoder 180 may employ a pruning strategy. For example, for a formal database language like SQL, a desired sub search space can be characterized and pruned effectively because database fields 206 that appear in different SQL clauses must come from tables 202 predicted in the FROM clause.

Figure 4:
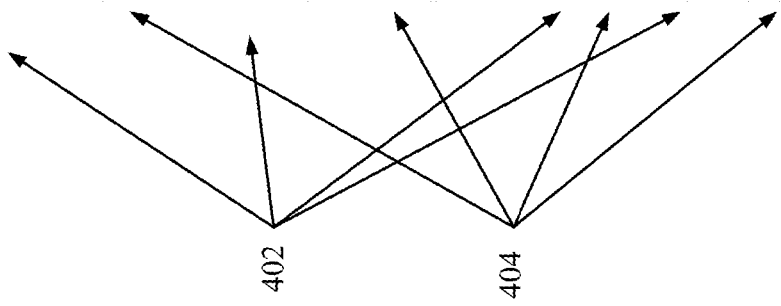
FIG. 4 is a diagram illustrating a written order and an execution order for a query, according to some embodiments.

In some embodiments, the clauses of each SQL query in a training set, such as the Spider training set, may be rearranged into the standard database engine execution order. For example, the SQL query "SELECT COUNT(*) FROM Properties" may be converted to "FROM Properties SELECT COUNT(*)". FIG. 4 is a diagram 400 illustrating a written 402 order and an execution order 404 for database queries Y 160. Compared to the written order, the execution order implements a coarse-to-fine data operation flow which first selects and joins relevant tables, then specifies data filtering criteria, then selects relevant fields and finally performs sorting and offsetting on the selected data. Generating the database query Y 160, such as a SQL query, in this order enables decoder 180 to learn the data operation pattern and biases decoder 180 towards the subspace with a higher schema consistency.

In some embodiments, queries Y 160 with clauses in execution order may satisfy the Lemma 1 below which indicates a strong search space pruning strategy. To satisfy Lemma 1, let $Y_{exec}$ be query Y 160, such as a SQL query, with clauses arranged in execution order. In this case, any table field in $Y_{exec}$ must appear after the corresponding table. By applying a binary attention mask $\xi$:

$$\tilde{a}_t^{(H)} = \tilde{a}_t^{(H)} \cdot \xi \quad \text{Equation 11}$$

which initially has entries corresponding to all table fields 206 set to 0. Once table $t_i$ is decoded, all entries in $\xi$ corresponding to fields $\{c_{i1}, \ldots, c_{i|T_i|}\}$ of table $t_i$ are set to one. This allows decoder 180 to only search in the space satisfying the condition in Lemma 1 with little change to the decoding speed.

Figure 5:
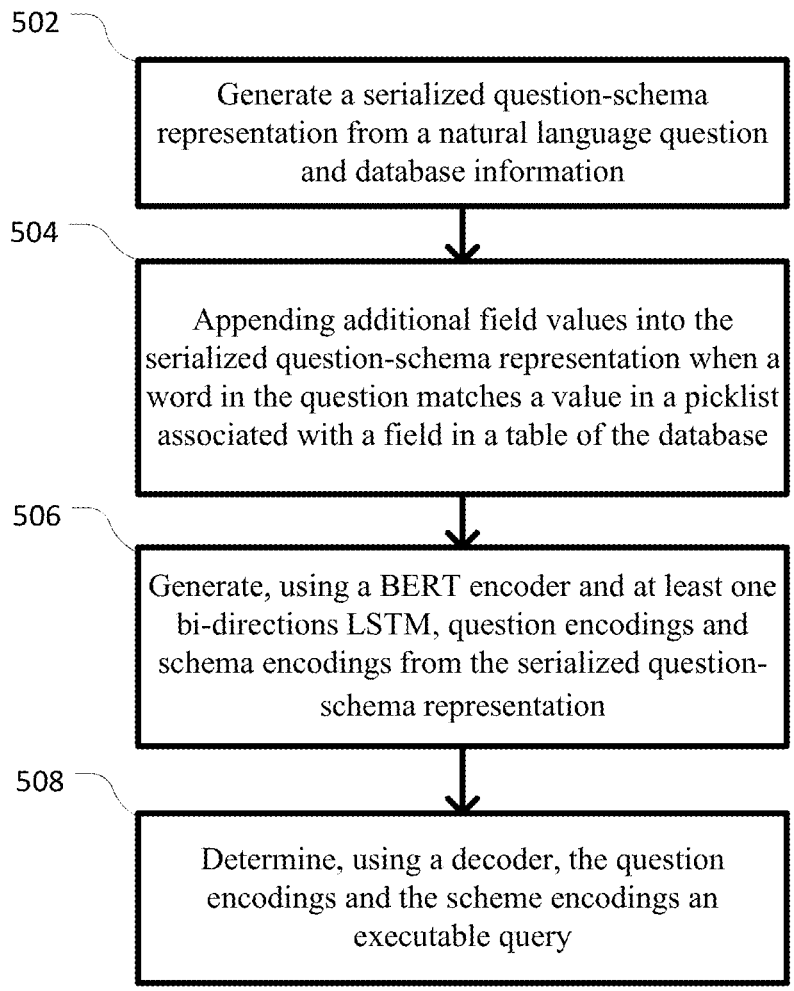
FIG. 5 is a simplified diagram of a method for translating a natural language question into a database query, according to some embodiments.

FIG. 5 is a simplified diagram of a method 500 for generating a query for a natural language question, according to some embodiments. One or more of the processes 502-508 of method 500 may be implemented, at least in part, in the form of executable code stored on non-transitory, tangible, machine-readable media that when run by one or more processors may cause the one or more processors to perform one or more of the processes 502-508.

At process 502, a serialized question-schema representation is generated. For example, encoder 170 may receive question Q 140 and database information 150, such as a database schema S. From question Q 140 and database information 150, encoder 170 may generate serialized question-schema representation X 208. The serialized question-schema representation X 208 includes question Q 140, one or more tokens that are table names 210 of tables 202 and field names 212 of fields 206 in database information 150. Tokens that are question Q 140, table names 210 and field names 212 may be separated by special tokens. For example, question Q 140 and database information 150 may be separated by the special token [SEP], special token [T] may precede each table name 210, and special token [C] may precede each field name 212 that follows table name 210. Special token [CLS] may indicate a beginning of the serialized question-schema representation X 208.

At process 504, additional field names are appended to the serialized question-schema representation X. For example, fuzzy string module 230 may determine field names 212 that are associated with picklists 228. Fuzzy string module 230 may then determine if there is a match between words in question Q 140 and words in one or more picklists 228. If there is a match, fuzzy string module 230 may append the matched words as additional field values to serialized question-schema representation X 208 after the field name 212 associated with the corresponding picklist 228. In some embodiment, the additional field values 232 may be separated using a special token [V].

At process 506, encodings are generated. For example, encoder 170 may use BERT encoder 214 and bi-directional LSTM 216 to generate base question-schema encodings $h_X$ from the serialized question-schema representation X 208. In some embodiments, encoder 170 may further generate question encodings $h_Q$ by passing the question segment representations of encodings $h_X$ through bi-directional LSTM 220. Encoder 170 is further trained to identify metadata features of the database information 150, e.g. the database schema S, using dense look-up features of projection layer g 224. Projection layer g 224 may be a neural network trained to recognize existence of keys and data types of fields 206. For example, dense look-up features of projection layer g 224 may be trained to determine if field 206 is a primary key, appears as a foreign key in another table, and a data type of field 206. The input to the projection layer g 224 may be the schema segment representation of encodings $h_X$ and output of projection layer g 224 may be schema encodings $h_S$.

At process 508, the encodings are decoded into a query. For example, decoder 180 may receive question encodings $h_Q$ and schema encodings $h_S$ and decode encodings $h_Q$ and $h_S$ into a sequence of tokens $\{y_i, \ldots, Y_{|Y|}\}$ that make up query Y 160. As discussed above, at each step t, decoder 180 selects a word from a vocabulary V, question Q 140 or database schema S for inclusion into query Y 160. For example, decoder 180 computer multi-head attention and the probability of generating a word from the vocabulary V, question Q 140 or database schema S at each step based on the question encodings $h_Q$ and schema encodings $h_S$ and the internal state $s_t$ of the decoder 180.

Some examples of computing devices, such as computing device 100 may include non-transitory, tangible, machine readable media that include executable code that when run by one or more processors (e.g., processor 110) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   receiving a natural language question and a database schema;
   generating a serialized question-schema representation from the natural language question and the database schema, wherein the serialized question-schema representation includes at least one word from the natural language question, at least one table name of a table in the database schema and at least one field name of a field associated with the table;
   generating, using a fuzzy string match, a set of multiple values from a picklist associated with the field, wherein the picklist links at least one word in the natural language question to the field, and wherein the set of multiple values includes words that match the at least one word in the natural language question and at least one value in the picklist;
   separating values in the set of multiple values with a value token;
   appending the set of multiple values from the picklist to the serialized question-schema representation;
   generating, using an encoder and at least one bi-directional long-short term memory (LSTM), question encodings and schema encodings from the serialized question-schema representation; and
   generating, using a decoder, an executable query from the question encodings and the schema encodings.

2. The method of claim 1, wherein generating the serialized question-schema representation further comprises:
   separating the natural language question and the database schema with a separator token;
   separating a table name in the at least one table name of the table with a table token; and
   separating a field name in the at least one field name of the field with a field token.

3. The method of claim 1, wherein the appending further comprises:
   appending the one or more values after the field name of the field; and
   separating a value in the one or more values with a value token.

4. The method of claim 1, wherein generating the question encodings further comprises:
   generating, using the encoder and a first bi-directional LSTM in the at least one bi-directional LSTM, base question-schema encodings; and
   generating, using a second bi-directional LSTM in the at least one bi-directional LSTM and a question segment of the base question-schema encodings the question encodings.

5. The method of claim 1, wherein generating the schema encodings further comprises:
   generating, using the encoder and a first bi-directional LSTM in the at least one bi-directional LSTM, base question-schema encodings; and
   generating, using a schema segment of the base question-schema encodings and a projection layer, the schema encodings.

6. The method of claim 5, wherein generating the schema encodings using the schema segment of the base question-schema encodings further comprises:
   determining, using the projection layer that includes a fusion neural network with a rectifier linear unit, that the schema encodings include the field that corresponds to a primary key.

7. The method of claim 5, wherein generating the schema encodings using the schema segment of the base question-schema encodings further comprises:
determining, using the projection layer that includes a fusion neural network with a rectifier linear unit, that the schema encodings include the field that corresponds to a foreign key.

8. The method of claim 5, wherein generating the schema encodings using the schema segment of the base question-schema encodings further comprises:
determining, using the projection layer that includes a fusion neural network with a rectifier linear unit, a data type of the field in the schema encodings.

9. The method of claim 1, wherein generating the executable query further comprises:
selecting, using the decoder, the question encodings, and the schema encodings, and an internal state of the decoder, a token from the natural language question, a token from the database schema or a token from a vocabulary for inclusion into the executable query.

10. A system comprising:
a memory;
a processor coupled to the memory and configured to:
receive a natural language question and a database schema;
generate a serialized question-schema representation from the natural language question and the database schema, wherein the serialized question-schema representation includes at least one word from the natural language question, at least one table name of a table in the database schema and at least one field name of a field associated with the table;
generate, using a fuzzy string match, a set of multiple values from a picklist associated with the field, wherein the picklist links at least one word in the natural language question to the field, and wherein the set of multiple values includes words that match the at least one word in the natural language question and at least one value in the picklist;
separate values in the set of multiple values with a value token;
append the set of multiple values from the picklist to the serialized question-schema representation;
generate, using an encoder and at least one bi-directional long-short term memory (LSTM) stored in the memory, question encodings and schema encodings from the serialized question-schema representation; and
generate, using a decoder, an executable query from the question encodings and the schema encodings.

11. The system of claim 10, wherein to generate the serialized question-schema representation the processor is further configured to:
separate the natural language question and the database schema with a separator token;
separate a table name in the at least one table name of the table with a table token; and
separate a field name in the at least one field name of the field with a field token.

12. The system of claim 10, wherein to generate the question encodings the processor is further configured to:
generate, using the encoder and a first bi-directional LSTM in the at least one bi-directional LSTM, base question-schema encodings; and
generate, using a second bi-directional LSTM in the at least one bi-directional LSTM and a question segment of the base question-schema encodings, the question encodings.

13. The system of claim 10, wherein to generate the schema encodings, the processor is further configured to:
generate, using the encoder and a first bi-directional LSTM in the at least one bi-directional LSTM, base question-schema encodings; and
generate, using a schema segment of the base question-schema encodings and a projection layer, the schema encodings.

14. The system of claim 13, wherein to generate the schema encodings using the schema segment of the base question-schema encodings, the processor is further configured to:
determine, using the projection layer that includes a fusion neural network with a rectifier linear unit, that the schema encodings include the field that corresponds to a primary key.

15. The system of claim 13, wherein to generate the schema encodings using the schema segment of the base question-schema encodings, the processor is further configured to:
determine, using the projection layer that includes a fusion neural network with a rectifier linear unit, that the schema encodings include the field that corresponds to a foreign key.

16. The system of claim 13, wherein to generate the schema encodings using the schema segment of the base question-schema encodings, the processor is further configured to:
determine, using the projection layer that includes a fusion neural network with a rectifier linear unit, a data type of the field in the schema encodings.

17. The system of claim 10, wherein to generate the executable query, the processor is further configured to:
select, using the decoder, the question encodings, and the schema encodings, and an internal state of the decoder a token from the natural language question, a token from the database schema or a token from a vocabulary for inclusion into the executable query.

18. A non-transitory computer readable medium storing instructions thereon, that when executed by a computing device cause the computing device to perform operations comprising:
receiving a natural language question and a database schema;
generating a serialized question-schema representation from the natural language question and the database schema, wherein the serialized question-schema representation includes at least one word from the natural language question, at least one table name of a table in the database schema and at least one field name of a field associated with the table;
generating, using a fuzzy string match, a set of multiple values from a picklist associated with the field, wherein the picklist links at least one word in the natural language question to the field, and wherein the set of multiple values includes words that match the at least one word in the natural language question and at least one value in the picklist;
separating values in the set of multiple values with a value token;
appending the set of multiple values from the picklist to the serialized question-schema representation;

generating, using an encoder and at least one bi-directional long-short term memory (LSTM), question encodings and schema encodings from the serialized question-schema representation; and generating, using a decoder, an executable query from the question encodings and the schema encodings.

19. The non-transitory computer readable medium of claim 18, wherein generating the serialized question-schema representation further comprises:

separating the natural language question and the database schema with a separator token;

separating a table name in the at least one table name of the table with a table token; and separating a field name in the at least one field name of the field with a field token.

20. The non-transitory computer readable medium of claim 18, wherein the appending further comprises:

appending the one or more values after the field name of the field; and separating a value in the one or more values with a value token.

\* \* \* \* \*